(12) United States Patent
Drachmann et al.

(10) Patent No.: US 9,903,745 B2
(45) Date of Patent: Feb. 27, 2018

(54) ULTRASONIC FLOW METER HAVING ULTRASONIC REFLECTORS INCLUDING AT LEAST 50% BY WEIGHT OF COPPER AND THE SIGNALS INCLUDING AT LEAST EIGHT PULSES

(71) Applicant: APATOR MIITORS ApS, Aarhus V (DK)

(72) Inventors: Jens Drachmann, Viby J (DK); Pol Martinez Caldwell, Aarhus C (DK)

(73) Assignee: APATOR MIITORS APS (DK)

( * ) Notice: Subject to any disclaimer, the term of this patent is extended or adjusted under 35 U.S.C. 154(b) by 0 days.

(21) Appl. No.: 14/916,909

(22) PCT Filed: Sep. 5, 2013

(86) PCT No.: PCT/DK2013/050281
§ 371 (c)(1),
(2) Date: Mar. 4, 2016

(87) PCT Pub. No.: WO2015/032401
PCT Pub. Date: Mar. 12, 2015

(65) Prior Publication Data
US 2016/0195418 A1 Jul. 7, 2016

(51) Int. Cl.
*G01F 1/66* (2006.01)
(52) U.S. Cl.
CPC .............. *G01F 1/662* (2013.01); *G01F 1/667* (2013.01)

(58) Field of Classification Search
None
See application file for complete search history.

(56) References Cited

U.S. PATENT DOCUMENTS

| | | | |
|---|---|---|---|
| 400,331 | A | 3/1889 | Graeser |
| 1,214,425 | A | 1/1917 | Caston |
| 1,473,751 | A | 11/1923 | Walker |
| 3,237,453 | A | 3/1966 | Yamamoto et al. |

(Continued)

FOREIGN PATENT DOCUMENTS

| | | |
|---|---|---|
| CN | 102680034 A | 9/2012 |
| DE | 10047383 C1 | 11/2001 |

(Continued)

*Primary Examiner* — Harshad R Patel
(74) *Attorney, Agent, or Firm* — St. Onge Steward Johnston and Reens, LLC (57) ABSTRACT

An ultrasonic flow meter is disclosed, the ultrasonic flow meter including a flow tube with a flow channel for a fluid to be measured, and two ultrasound reflectors fixated inside the flow tube, a first ultrasound transducer, a second ultrasound transducer, and an electronic control arrangement for operating the ultrasonic flow meter. The ultrasound transducers and reflectors have relative positions and orientations forming an ultrasound path from the first ultrasound transducer to the at least two ultrasound reflectors, to the second ultrasound transducer, and vice versa. The ultrasonic flow meter measures absolute transit times of the ultrasound signal from the first ultrasound transducer to the second ultrasound transducer, and/or vice versa, and the ultrasound reflectors include at least 50% by weight of copper, and the ultrasound signal includes at least 8 pulses.

20 Claims, 7 Drawing Sheets

(56) References Cited

U.S. PATENT DOCUMENTS

| | | | | |
|---|---|---|---|---|
| 4,754,650 | A | * | 7/1988 | Smalling ................ G01F 1/662 73/861.28 |
| 4,856,321 | A | * | 8/1989 | Smalling ................ G01F 1/662 73/40.5 A |
| 5,372,047 | A | * | 12/1994 | Russwurm .............. G01F 1/662 73/861.27 |
| 6,062,091 | A | * | 5/2000 | Baumoel ................. G01F 1/662 73/861.27 |
| 8,893,559 | B2 | | 11/2014 | Drachmann |
| 2003/0047007 | A1 | * | 3/2003 | Baumoel ................. G01F 1/662 73/861.27 |
| 2006/0156827 | A1 | * | 7/2006 | Lang ........................ G01F 5/00 73/861.25 |
| 2009/0293189 | A1 | * | 12/2009 | Somerville .............. B05B 1/18 4/597 |
| 2010/0101787 | A1 | * | 4/2010 | McCoy .................. E21B 43/121 166/250.03 |
| 2012/0006127 | A1 | | 1/2012 | Nielsen |
| 2013/0031988 | A1 | | 2/2013 | Drachmann |
| 2013/0047695 | A1 | * | 2/2013 | Drachmann ............ G01F 1/662 73/1.16 |

FOREIGN PATENT DOCUMENTS

| | | |
|---|---|---|
| DK | 177040 B1 | 2/2011 |
| EP | 0813041 A1 | 12/1997 |
| EP | 1798528 A1 | 6/2007 |
| EP | 1983311 A2 | 10/2008 |
| EP | 2083250 A1 | 7/2009 |
| EP | 2083251 A1 | 7/2009 |
| FR | 2750495 A1 | 1/1998 |
| GB | 1327651 A | 8/1973 |
| JP | 2008014833 A | 1/2008 |
| WO | 2004102499 A1 | 11/2004 |
| WO | 2007020375 A1 | 2/2007 |
| WO | 2008053193 A1 | 5/2008 |
| WO | 2010112029 A1 | 10/2010 |
| WO | 2011134470 A2 | 11/2011 |

* cited by examiner

ULTRASONIC FLOW METER HAVING
ULTRASONIC REFLECTORS INCLUDING
AT LEAST 50% BY WEIGHT OF COPPER
AND THE SIGNALS INCLUDING AT LEAST
EIGHT PULSES

FIELD OF THE INVENTION

The invention relates to an ultrasonic flow meter.

BACKGROUND OF THE INVENTION

Several ultrasonic flow meters are known within the art. One example is may be seen in international patent application WO 2011/134470 A2.

One problem related to such meters may be measuring the transit time accurately.

It may therefore be an object of the invention to increase the accuracy of the transit time measurements.

SUMMARY OF THE INVENTION

The invention relates to an ultrasonic flow meter comprising
  a flow tube defining an flow channel for a fluid to be measured, and
  at least two ultrasound reflectors fixated inside said flow tube,
  a first ultrasound transducer,
  a second ultrasound transducer,
  an electronic control arrangement for operating said ultrasonic flow meter,
said ultrasound transducers and reflectors having relative positions and orientations defining an ultrasound path from said first ultrasound transducer, via said at least two ultrasound reflectors, to said second ultrasound transducer, and vice versa,
said ultrasonic flow meter being adapted to measure absolute transit times of an ultrasound signal from said first ultrasound transducer to said second ultrasound transducer, and/or vice versa,
wherein said ultrasound reflectors comprises at least 50% by weight of copper, and
wherein said ultrasound signal comprises at least 8 pulses.

It may be an object of the invention to obtain more accurate absolute transit time measurements.

One advantage of the invention may be that a more accurate measurement of the absolute transit times may be obtained. As a result of the temporal uncertainty being lowered, a more accurate measurement of the flow through the flow tube may be obtained.

Surprisingly, it has been discovered by the inventors of the present invention that some reflector materials may be significantly advantageous compared to materials, which are normally used, such as stainless steel. Typically, it may be the goal to maximize the difference between the acoustic impedance of the reflector material and the fluid. Typically, many fluids have an acoustic impedance lower that metals used as reflectors. Therefore, typically, materials with a high acoustic impedance are chosen. Since environmental and health concerns often restrict the choice of materials, it is generally established within the art to use stainless steel reflectors.

However, it has surprisingly been discovered by the inventors that by using reflectors of materials comprising large amounts of copper in amounts of at least 50% by weight, hereunder e.g. many brass materials, an improved accuracy of the flow measurement may be obtained. Studies show that this may be a result of the fact that ultrasound signal may often excite certain acoustic surface modes in the ultrasound reflectors, which may lead to distortion and/or noise being introduced into the signal, thereby lowering the accuracy of the measurement of the transit time, and, ultimately, to a lowering of the accuracy of the measurement of the fluid flow. However, by using reflectors according to the invention, the inventors were able to significantly reduce the induced distortion and measure the transit time, and, consequently, the fluid flow, more accurately.

In more detail, one significant advantage of the invention may be that both an absolute transit time for an ultrasound signal from said first ultrasound transducer to said second ultrasound transducer, and/or vice versa, and the difference time between the two transit times may be found by
  transmitting a first ultrasound signal from said first ultrasound transducer and detecting said first ultrasound signal by said second ultrasound transducer, and
  transmitting a second ultrasound signal from said second ultrasound transducer and detecting said second ultrasound signal by said first ultrasound transducer,
without having to transmit further ultrasound signals. Since the two ultrasound signals are relatively long, i.e. at least 8 pulses, the difference time between the two transit times may be determined with superior precision, e.g. by finding the phase difference between the two detected signals. Furthermore, by using ultrasound reflectors of the invention, the received signals may be sufficiently free of reflector-induced distortion to perform a comparison of each of them with an emulated model of the flow meter based on measured characteristics of the first and second ultrasound transducers in order to establish absolute transit times. Furthermore, since a flow indication may typically be calculated from measurements of the absolute transit times and from a difference between the transit times, the flow meter invention may measure a flow with a very large precision. Since the absolute transit time as well as the difference between the two transit times may be found with great precision as described above by an ultrasonic flow meter according to the invention without having to transmit further ultrasound signals, said ultrasonic flow meter of the invention may advantageously have a significantly lowered power consumption.

In more detail and further to the above described advantage, establishing both absolute transit times and difference between such transit time from the same measured signals with great precision may often prove difficult, if not impossible, since measuring absolute transit time with great precision would typically require very short ultrasound signals, such as single pulse signals, while measuring difference time between the transit times with great precision may often require long signals comprising several pulses, such as at least 8 pulses, or even more. However, the inventors of the present invention have surprisingly found that by using ultrasound reflectors according to the invention, this may be achieved.

One advantage of the invention may be that the velocity of the ultrasound in the reflectors is reduced, thereby reducing the coupling of energy into disadvantageous surface vibrational modes, which may induce distortion into the ultrasound signal. Thereby, it may be possible to obtain flow measurements with a relatively high accuracy.

In further detail, one advantage of the invention may be that inducing of distortions and changes into the ultrasound signal may be avoided or at least significantly lowered. Such distortion and changes may alter the shape of the received signal, making it difficult to use this shape as basis for the calculation of the absolute transit time.

It should be noted that many known ultrasonic flow meters may be adapted for measuring the flow of water, hereunder drinking water, and, possibly, other fluids, such as gasses and/or liquids. In some cases brass materials comprising at least 50% by weight of copper may be considered unsuitable for drinking water applications, e.g. due to a content of lead. It has, however, been discovered by the inventors of the present invention that many types of materials comprising at least 50% by weight of copper, hereunder brass materials, may be manufactured with lead levels conforming with usage of the ultrasonic flow meter for measuring flow of drinking water.

One advantage of the invention may be that the ultrasonic flow meter comprises ultrasound reflectors, which are separate from said flow tube. Often, when placing an order of a number of flow meters, the diameter of the flow tube may be adapted to fit the need of the specific client. When adapting an ultrasonic flow meter to confirm with such demands, the changing of the configuration of separate ultrasound reflectors, which may e.g. be fixated inside the flow tube by a flow channel insert, may be relatively simple.

According to an embodiment of the invention, said ultrasound reflectors may preferably be made of brass. However, it should be understood that the term "brass" may be used for a number of relatively different alloys. Although it may typically be seen as an alloy comprising copper and zinc in relatively large amount, and typically also comprising a relatively large amount of copper, such as e.g. at least 50% by weight, while concentration of zinc may typically second only to copper, and zinc may typically be present in an amount of at least 10% by weight. A number of other elements may be present, although typically in relatively small amount, such as e.g. a few percent or even less.

According to an embodiment of the invention, said ultrasound reflectors comprises between 50 and 90% by weight of copper.

According to an advantageous embodiment of the invention, said ultrasonic flow meter furthermore is adapted to measure the temporal difference between the transit time of an ultrasound signal from said first ultrasound transducer to said second ultrasound transducer and vice versa.

One advantage of the above embodiment may be that the fluid flow may be measured very precisely.

According to an embodiment of the invention, this may be done e.g. by calculating the time difference from a phase difference between two measured signals.

According to an advantageous embodiment of the invention, said at least two ultrasound reflectors comprise three ultrasound reflectors.

One advantage of the above embodiment may be that an advantageous ultrasonic flow meter that can measure a flow with great precision may be constructed. In further detail it is possible to construct a ultrasonic flow meter having an ultrasound path with a sufficient length, which may be difficult to construct with fewer reflectors, especially only one reflector, at least without increasing the diameter of the flow tube, which may often be rather disadvantageous. Furthermore, an advantageous setup may be constructed where the ultrasound reflectors does not impede the flow of the fluid or, at least, where the impact of the ultrasound reflector on the fluid is substantially decreased. In some alternative solutions with only two ultrasound reflectors, these ultrasound reflectors may often be positioned such that they inflict significant disturbance in the fluid flow, e.g. by being positioned near or around the middle of the flow tube, where the flow velocity may typically be highest. Finally, while achieving the above mentioned advantages, this may, in an embodiment, be done with only three ultrasound reflectors, which may be an advantage since employing fewer ultrasound reflectors may reduce noise, errors and/or signal loss introduced by the reflectors.

According to an advantageous embodiment of the invention, said at least two ultrasound reflectors consist of three ultrasound reflectors.

One advantage of the above embodiment may be that an advantageous ultrasonic flow meter that can measure a flow with great precision may be constructed. In further detail it is possible to construct an ultrasonic flow meter having an ultrasound path with a sufficient length, which may be difficult to construct with fewer reflectors, especially only one reflector, at least without increasing the diameter of the flow tube, which may often be rather disadvantageous. Furthermore, an advantageous setup may be constructed where the ultrasound reflectors does not impede the flow of the fluid or, at least, where the impact of the ultrasound reflector on the fluid is substantially decreased. In some alternative solutions with only two ultrasound reflectors, these ultrasound reflectors may often be positioned such that they inflict significant disturbance in the fluid flow, e.g. by being positioned near or around the middle of the flow tube, where the flow velocity may typically be highest. Finally, by using only three ultrasound reflectors, the above mentioned advantages may be obtained while also an advantage associated with employing fewer ultrasound reflectors, namely that noise, errors and/or signal loss introduced by the reflectors may be reduced.

According to an advantageous embodiment of the invention, said at least two ultrasound reflectors are focusing.

One advantage of the above embodiment may be that the fraction of the emitted signal emitted by one transducer, which is received by opposite transducer, may be substantially higher, while inducing relatively little distortion into the ultrasound signal.

The inventors have discovered that the problems related to distortion of the ultrasound signal, which may be particularly pronounced when using focusing reflectors, may be solved by the use of the ultrasound reflectors of the invention.

According to an advantageous embodiment of the invention, said at least two ultrasound reflectors are concave.

One advantage of the above embodiment may be that the fraction of the emitted signal emitted by one transducer, which is received by opposite transducer, may be substantially higher, while inducing relatively little distortion into the ultrasound signal.

The inventors have discovered that the problems related to distortion of the ultrasound signal, which may be particularly pronounced when using concave focusing reflectors, may be solved by the use of the ultrasound reflectors of the invention.

According to an embodiment of the invention, said ultrasonic flow meter is a utility meter, measuring the consumption of a utility, such as e.g. water, e.g. for heating or drinking, gas, or other utilities.

According to an advantageous embodiment of the invention, said fluid is a liquid, such as e.g. water, milk or petroleum derivatives such as gasoline.

One advantage of the above embodiment may be that the advantageous effect of the ultrasound reflectors may be particularly pronounced. Particularly, the above advantage may be especially pronounced when said liquid comprises water in an amount from 50 to 100% by weight.

Also, an advantageous embodiment is obtained when said liquid is for human consumption.

According to an alternative embodiment, said fluid is a gas.

According to an advantageous embodiment of the invention, said at least two ultrasound reflectors are orientated with a non-zero angle relative to a longitudinal axis of the flow tube.

It should be understood in connection to the above embodiment that by said at least two ultrasound reflectors being oriented with an angle relative to a longitudinal axis of the flow tube is preferably meant that the reflecting surface, or, when the reflecting surface is not flat, the flat surface best approximating the reflecting surface is orientated with an angle relative to a longitudinal axis of the flow tube, i.e. a non-zero angle, such as an angle larger than 2°, such as larger than 5°, such as larger than 10°.

The inventors have discovered that the problems related to distortion of the ultrasound signal, which may be particularly pronounced when using angled reflectors, may be solved by the use of the ultrasound reflectors of the invention.

According to an advantageous embodiment of the invention, said ultrasound signal comprises at least 10 pulses, such as at least 12 pulses, such as at least 14 pulses, such as at least 16 pulses, such as at least 18 pulses, such as at least 20 pulses.

One significant advantage of the above embodiment may be that the ultrasonic flow meter is adapted to measure with great precision a difference between a first transit time of a first ultrasound signal from said first ultrasound transducer to said second ultrasound transducer and a second transit time of a second ultrasound signal from said second ultrasound transducer to said first ultrasound transducer, from which a flow indication may be calculated.

According to an embodiment of the invention, said ultrasound signal comprises at between 10 and 50 pulses, such as between 12 and 40 pulses, such as between 14 and 35 pulses, such as between 16 and 30 pulses, such as between 18 and 25 pulses, such as between 20 and 23 pulses.

According to an advantageous embodiment of the invention, said ultrasonic flow meter is adapted to emulate a flow meter response similar to an output signal of a receiver circuit of the ultrasonic flow meter as the output signal would be, if there was no time delay in the transmission of an ultrasonic signal between said first and second ultrasound transducers.

An advantage of the above embodiment may be that an absolute transit time of an ultrasound signal between said first and second ultrasound transducers may be measured very accurately.

According to an advantageous embodiment of the invention, said emulation of said flow meter response may comprise
  characterizing said first ultrasound transducer,
  characterizing said second ultrasound transducer, and
emulating said flow meter response on the basis of said characterizations.

An advantage of the above embodiment may be that an absolute transit time of an ultrasound signal between said first and second ultrasound transducers may be measured very accurately.

According to an advantageous embodiment of the invention, said ultrasonic flow meter is adapted to measure an absolute transit time by
  characterizing said first and second ultrasound transducers,
  establishing a numerical model of said first and second ultrasound transducers,
  simulating the ultrasonic flow meter by entering an input signal into said numerical model, thereby establishing a simulated flow meter response as if there was no time delay in the transmission of an ultrasound signal between said first and second ultrasound transducers,
  measuring a measured flow meter response, i.e. the actual signal received by a receiving circuit of the receiving transducer,
  calculating said absolute transit time as the time delay between the simulated flow meter response and the measured flow meter response.

Further to the above embodiment it should be understood that by the receiving transducer is meant either said first or second ultrasound transducer, the receiving transducer being the opposite of the transducer transmitting the ultrasound signal. Typically, both the first and the second ultrasound transducer subsequently play the role of the transmitting and receiving transducer so as to establish a first and a second transit time.

According to an embodiment, one way of calculating the time delay may comprise determining an envelope function of the simulated and the measured flow meter responses and determining the time difference between the two points, in which the filtered envelopes have reached 50% of their maximum value.

According to an embodiment, one other way of determining the absolute transit times, which may often be employed over the above described method of envelope functions, comprises determining the time delay as the slope of the group time delay of the phase angle between the simulated and the measured signals.

According to an embodiment of the invention, said emulation of said flow meter response may comprise one or more of
  feeding a single pulse signal to a signal generator driving said first ultrasound transducer, said signal generator comprising an active component, monitoring current to the active component from one or more voltage supplies during and after the feeding of the input signal to the signal generator, thus obtaining a single pulse supply current signal for said first ultrasound transducer, and adjusting the single pulse supply current signal for obtaining an emulated single pulse response of the first transducer,
  feeding a single pulse signal to a signal generator driving said second ultrasound transducer, said signal generator comprising an active component, monitoring current to the active component from one or more voltage supplies during and after the feeding of the input signal to the signal generator, thus obtaining a single pulse supply current signal for said second ultrasound transducer, and adjusting the single pulse supply current signal for obtaining an emulated single pulse response of the second transducer,
  finding the single pulse response of the system by making a convolution of the two obtained signal pulse responses of the first and second transducers, and
  calculating the emulated flow meter response by combining a number of instances of the found single pulse response of the system, which are repeated with suitable delays.

According to an advantageous embodiment of the invention, said ultrasonic flow meter is adapted to measure absolute transit times with a temporal uncertainty below $\frac{1}{20}$ of the temporal length of the ultrasound signal, such as below 1/50 of the temporal length of the ultrasound signal, such as below 1/100 of the temporal length of the ultrasound signal, such as below 1/150 of the temporal length of the ultrasound signal, such as below 1/200 of the temporal length of the ultrasound signal.

One advantage of the above embodiment may be that the ultrasonic flow meter may measure the flow of the fluid with great precision.

According to an advantageous embodiment of the invention, said ultrasonic flow meter is adapted to measure absolute transit times with a temporal uncertainty below one period of the ultrasound signal, such as below 1/5 of a period of the ultrasound signal, such as below 1/10 of period of the ultrasound signal.

One advantage of the above embodiment may be that the ultrasonic flow meter may measure the flow of the fluid with great precision.

According to an advantageous embodiment of the invention, said ultrasound signal has a temporal length of between 5 and 100 µs, such as between 10 and 70 µs, such as between 15 and 40 µs, such as between 18 and 25 µs.

One advantage of the above embodiment may be that the ultrasonic flow meter may measure the flow of the fluid with great precision.

According to an advantageous embodiment of the invention, said at least two ultrasound reflectors comprise brass.

One advantage of the above embodiment may be that an ultrasound signal transmitted through the ultrasonic flow meter may be relatively undistorted by said ultrasound reflectors. Thereby, the absolute transit times from the first ultrasound transducer to the second ultrasound transducer, and vice versa, may be measured with a relatively high precision and, therefore, the flow of the fluid may be measured with relatively high precision.

Another advantage of the above embodiment may be that brass may be relatively easy to process and machine.

According to an embodiment of the invention, said ultrasound reflectors are made of brass.

One advantage of the above embodiment may be that an ultrasound signal transmitted through the ultrasonic flow meter may be relatively undistorted by said ultrasound reflectors. Thereby, the absolute transit times from the first ultrasound transducer to the second ultrasound transducer, and vice versa, may be measured with a relatively high precision and, therefore, the flow of the fluid may be measured with relatively high precision.

Another advantage of the above embodiment may be that brass may be relatively easy to process and machine.

According to an advantageous embodiment of the invention, said at least two ultrasound reflectors comprise at least 55% by weight of copper, such as at least 60% by weight, such as at least 65% by weight, such as at least 70% by weight, such as at least 75% by weight.

One advantage of the above embodiment may be that such reflectors comprising copper in the above mentioned amounts may be relatively easy to process and machine, while inducing relatively little distortion into the ultrasound signal.

According to an embodiment of the invention, the ultrasound reflectors comprise no more than 99% by weight of copper, such as no more than 95% by weight, such as no more than 90% by weight, such as no more than 85% by weight, such as no more than 80% by weight, such as no more than 75% by weight, such as no more than 70% by weight.

According to an advantageous embodiment of the invention, said at least two ultrasound reflectors comprise 50-90% by weight of copper, such as 60-85% by weight, such as 70-80% by weight.

One advantage of the above embodiment may be that such reflectors comprising copper in the above mentioned amounts may be relatively easy to process and machine, while inducing relatively little distortion into the ultrasound signal.

According to an advantageous embodiment of the invention, said at least two ultrasound reflectors comprise at least 10% by weight of zinc, such as at least 15% by weight, such as at least 20% by weight, such as at least 25% by weight.

One advantage of the above embodiment may be that such reflectors comprising copper in the above mentioned amounts may be relatively easy to process and machine, while inducing relatively little distortion into the ultrasound signal.

According to an advantageous embodiment of the invention, said at least two ultrasound reflectors comprise 5-40% by weight of zinc, such as 15-30% by weight.

An advantage of the above embodiment may be that brass is a material, which is relatively easy to process and machine, while inducing relatively little distortion into the ultrasound signal.

According to an advantageous embodiment of the invention, said at least two ultrasound reflectors comprise 0-0.5% by weight of lead, such as 0-0.1% by weight.

Thereby, said ultrasonic flow meter may typically be used to measure drinking water, or at least fulfill requirements of low lead-content.

According to an advantageous embodiment of the invention, said at least two ultrasound reflectors are substantially free of lead.

Thereby, said ultrasonic flow meter may typically be used to measure drinking water, or at least fulfill requirements of low lead-content.

According to an advantageous embodiment of the invention, said at least two ultrasound reflectors comprise 70-80% by weight of copper, such as 75-76% by weight,
said at least two ultrasound reflectors comprise 1-5% by weight of silicon, such as 2.5-3.5% by weight,
said at least two ultrasound reflectors comprise 19-24% by weight of zinc, such as 21-22% by weight, and
said at least two ultrasound reflectors comprise 0-0.5% by weight of lead, such as 0-0.1% by weight.

One advantage of the above embodiment may be that the reflectors may be used in drinking water meters or other meters which have to comply with conditions relating to health and/or environmental concerns. Especially, the composition according to the above embodiment may be relatively simple to process and machine, while inducing relatively little distortion into the ultrasound signal.

According to an embodiment of the invention, said brass comprises at least
  50% by weight of copper, and
  10% by weight of zinc.

According to an embodiment of the invention, said ultrasonic flow meter is adapted to sample a signal received by said first and/or second ultrasound transducer with a frequency less than twice the frequency of the emitted ultrasound signal, such as about 60-80% of twice the frequency of the emitted ultrasound signal.

One advantage of the above embodiment may be that sampling at lower frequencies reduces the power consumption of the ultrasonic flow meter, and that sufficient information may, in some cases, when care is taken, be extracted from the under sampled signal, and finally, that this extraction is made simpler and/or more efficient due to the reduction in distortion in the received ultrasound signal resulting from the use of ultrasound reflectors of the invention.

According to an example embodiment, the sampling frequency may be about 70% of twice the frequency of the emitted ultrasound signal.

According to an embodiment of the invention, the meter housing comprises a composite material, such as a glass fiber reinforced plastic material.

According to an embodiment of the invention, the meter housing consists substantially of a composite material, such as a glass fiber reinforced plastic material.

Alternatively, said meter housing may comprise other materials.

According to an advantageous embodiment of the invention, said at least two ultrasound reflectors have thickness between 0.25 and 1.5 mm, such as about 0.5 or about 1.0 mm.

According to an advantageous embodiment of the invention, said ultrasonic flow meter comprises a battery for powering said ultrasonic flow meter.

According to an embodiment, the ultrasonic flow meter may be solely powered by said battery. However, in alternative embodiments, the meter may have an external power source, the battery supplying power in case of failure of the external power source.

Several advantages may be especially pronounced for battery powered meters, particularly the power saving associated with the invention and several embodiments. One example may be that by transmitting a relatively long ultrasound signal, such as above 10 pulses, from said first to said second transducer and vice versa, and from the two received signals and simulations of the flow meter calculating both the absolute transit times and the transit time difference, without transmission of further ultrasound signals. Thereby, battery powered meters, in which the battery may have a particular long life time may be obtained.

According to an alternative embodiment, the ultrasonic flow meter is externally powered.

According to an advantageous embodiment of the invention, said electronic control arrangement is adapted to calculate the transit time of an ultrasound signal from said first ultrasound transducer to said second ultrasound transducer, or vice versa.

According to an embodiment of the invention, the electronic control arrangement may identify the transit time with a temporal uncertainty less than the temporal length of the ultrasound signal.

According to an advantageous embodiment of the invention, said ultrasound path have a length between 20 and 200 mm, such as between 30 and 150 mm, such as between 30 and 100 mm, such as between 40 and 75 mm.

According to one example embodiment of the invention, said ultrasound path have a length of about 50 mm, which may in embodiments where the fluid is water correspond to a temporal length of about 33 µs.

According to an embodiment of the invention, said ultrasound path have a length no more than 200 mm, such as no more than 150 mm, such as no more than 100 mm, such as no more than 75 mm.

According to an advantageous embodiment of the invention, said ultrasonic flow meter comprises a flow channel insert, said at least two ultrasound reflectors being fixated in said flow channel insert.

According to an embodiment of the invention, said flow channel insert comprises a composite material, such as a glass fiber reinforced plastic material.

According to an embodiment of the invention, said flow channel insert consists substantially of a composite material, such as a glass fiber reinforced plastic material.

Alternatively, said flow channel insert may comprise other materials.

According to an embodiment of the invention, said flow tube may comprise brass.

According to an embodiment of the invention, said flow tube may comprise a material similar to said ultrasound reflectors.

Alternatively, said flow tube may comprise other materials.

According to an embodiment of the invention, said flow tube is tubular.

Alternatively, the flow tube may have another shape.

According to an embodiment of the invention, said first and second ultrasound transducers are adapted to emit ultrasound having a frequency between 0.1 and 100 MHz, such as between 0.5 and 10 MHz, such as between 0.5 and 2 MHz.

According to an advantageous embodiment of the invention, said ultrasonic flow meter comprises a meter housing, said first and second ultrasound transducer and said electronic control arrangement being positioned inside said meter housing.

Furthermore, other components may typically, according to an embodiment, be arranged inside said meter housing, such as e.g. a battery, connections between the electronic control arrangement and other components, displays, etc.

According to an advantageous embodiment of the invention, said ultrasound path have an angle relative to a surface normal of a reflecting surface of said at least two ultrasound reflectors between 10 and 40°, such as between 20 and 30°.

One advantage of the above embodiment may be that a relatively undistorted ultrasound signal may be transmitted from said first ultrasound transducer to said second ultrasound transducer, or vice versa, with relatively little distortion induced by said at least two ultrasound transducers, which again leads to a relatively precise determination of the flow of the fluid.

According to an advantageous embodiment of the invention, said flow channel insert comprises two half-parts.

One advantage of the above embodiment may be that the reflectors may be fixated inside the flow tube in a simple way. Sometimes, it may be relatively complicated to fixate the reflectors inside the flow tube, e.g. if the flow tube, according to an embodiment, is a single-piece tube having only end openings for the fluid flow and two side openings the transducer recesses in the meter housing to engage. However, by fixating the reflectors between two half-parts of said flow channel insert, i.e. inside a flow tube, the fixation of the ultrasound reflectors may, therefore, simply rely on the fixation of the flow channel insert. The flow channel insert may typically be dimensioned to match the cross section of the flow tube, thereby being fixation transversely relative to the flow tube. Longitudinal fixation, i.e. relative to a direction parallel to the longitudinal axis of the flow tube, may e.g. be accomplished by the transducer recesses of the meter housing engaging, through openings of the flow tube, openings in the flow channel insert.

According to an alternative embodiment, said ultrasonic reflectors are otherwise fixated in the flow channel insert.

The invention furthermore relates to an ultrasonic flow meter comprising a flow tube defining an flow channel for a fluid to be measured, and at least two ultrasound reflectors fixated inside said flow tube, a first ultrasound transducer, a second ultrasound transducer, an electronic control arrangement for operating said ultrasonic flow meter, said ultrasound transducers and reflectors having relative positions and orientations defining an ultrasound path from said first ultrasound transducer, via said at least two ultrasound reflectors, to said second ultrasound transducer, and vice versa, said ultrasonic flow meter being adapted to measure absolute transit times of an ultrasound signal from said first ultrasound transducer to said second ultrasound transducer, and/or vice versa, said ultrasonic reflectors being made by a reflector material, wherein said ultrasound signal has a velocity in said reflector material between 3000 and 5500 m/s, such as between 4000 and 5000 m/s, such as between 4300 and 4600 m/s, and wherein said ultrasound signal comprises at least 8 pulses.

One advantage of the invention as described above may be that the absolute transit times of an ultrasound signal from said first ultrasound transducer to said second ultrasound transducer, or vice versa, may be measured relatively accurately, and that the flow of the fluid may therefore be established with great precision.

According to an advantageous embodiment of the invention, said reflector material has an acoustic impedance of at least 20 MRayl ($10^6$ kg/(s·m$^2$)), such as at least 30 MRayl ($10^6$ kg/(s·m$^2$)), such as at least 35 MRayl ($10^6$ kg/(s·m$^2$)), such as at least 40 MRayl ($10^6$ kg/(s·m$^2$)).

One advantage of the above embodiment may be that the absolute transit times of an ultrasound signal from said first ultrasound transducer to said second ultrasound transducer, or vice versa, may be measured relatively accurately, and that the flow of the fluid may therefore be established with great precision. Furthermore, as the acoustic impedance may be relatively high, the reflection of ultrasound by an interface between a fluid, such as e.g. water, and said reflector material may be relatively high, resulting in an effective reflection of the ultrasound signal, and, ultimately, a very precise ultrasonic flow meter.

The above ultrasonic flow meter may advantageously be combined with any embodiment of the invention.

FIGURES

The invention will be described in the following with reference to the figures in which.

DETAILED DESCRIPTION OF THE INVENTION

According to an embodiment, the flow of a fluid may be determined in an ultrasonic flow meters 1 by calculating it from a first transit time $t_1$ from the first ultrasound transducer 3 to the second ultrasound transducer 4 and a second transit time $t_2$ from the second ultrasound transducer 4 to the first ultrasound transducer 3. Specifically, the following formula may be used to calculate a fluid flow $\Phi$ $$\Phi \propto K(t_1 - t_2, t_1 + t_2) \cdot \frac{t_1 - t_2}{t_1 + t_2} \qquad \text{(Equation 1)}$$

where $K(t_1-t_2, t_1+t_2)$ is a correction factor, which may typically be determined once and for all for a given meter and a given fluid. The correction factor may correct for such factors as e.g. dimensions and physical configuration of the fluid flow path 15, and the viscosity of the fluid to be measured.

As can be seen from Equation 1, once the table of correction factors has been established, the flow indication can be calculated from the two quantities $(t_1-t_2)$ and $(t_1+t_2)$.

The first of these quantities, $(t_1-t_2)$, which is the difference between the first and second transit time, may typically be in the order of a few nanoseconds, but may typically easily be determined e.g. by finding the phase difference between the two reception signals. This may be done very precisely (with an accuracy of down to between 10 and 100 picoseconds) by several analogue and digital methods well-known through many years, due to the fact that the two reception signals may typically be identical except for a phase difference due to the different transit times ($t_1$ and $t_2$), e.g. given that the reciprocity theorem for linear passive circuits applies. Generally, this is the case if it is assured that the impedance, as seen from the transducers 3, 4 is the same, regardless of whether the transducers 3, 4 are acting as transmitters or receivers of ultrasound.

On the other hand, it may be very difficult to determine accurately the other quantity, $(t_1+t_2)$, which is the sum of the two transit times, typically in the order of a few microseconds, because it involves a calculation of the exact transit times ($t_1$ and $t_2$), which again requires a very precise determination e.g. of the front edge of each of the reception signals, which is by no means a simple task due to the shape of the reception signals.

Therefore, in some known flow meters, this quantity is, in fact, not calculated. Instead, it may be estimated using the following equation:

$$\frac{d}{c} = t \approx t_1 \approx t_2 \qquad \text{(Equation 2)}$$

In this equation, d is the distance between the two transducers 3, 4 and c is the velocity of ultrasound in the actual fluid, the flow of which is being metered. For a given flow meter, d is known from the physical positions of the transducers 3, 4 in the fluid flow path 15, and, for a given temperature, the velocity of ultrasound in a given fluid can be found in a table. Thus, by measuring the temperature of the fluid, an estimate of $t_1$ and $t_2$ can be found, which can then be used for estimating the quantity $(t_1+t_2)$ to be used in Equation 1.

It has, however, been discovered by the inventors that absolute transit times may be measured with substantially higher precision that the estimation illustrated in Equation 2 when using an ultrasonic flow meter according to the invention.

If one should measure only an absolute transit time, it may often be better to use an ultrasound signal, which is very short, such as only a single pulse. Advantageously, however, according to an embodiment of the invention, the absolute transit times are measured by ultrasound signals which are also used to measure the difference between the first and second transit times, $(t_1-t_2)$. In order to measure the difference between the first and second transit times, $(t_1-t_2)$, an ultrasound signal of several pulses must be used, such as at least 8 pulses. Such as multi-pulse signal may however, often be disadvantageous for determining the absolute transit time in some meters, since distortion is introduced in the signal by the ultrasound reflectors.

The inventors, however, have discovered that by using ultrasound reflectors comprising at least 50% by weight of copper, such as e.g. brass, the induced distortion may be significantly reduced.

Figure 7:
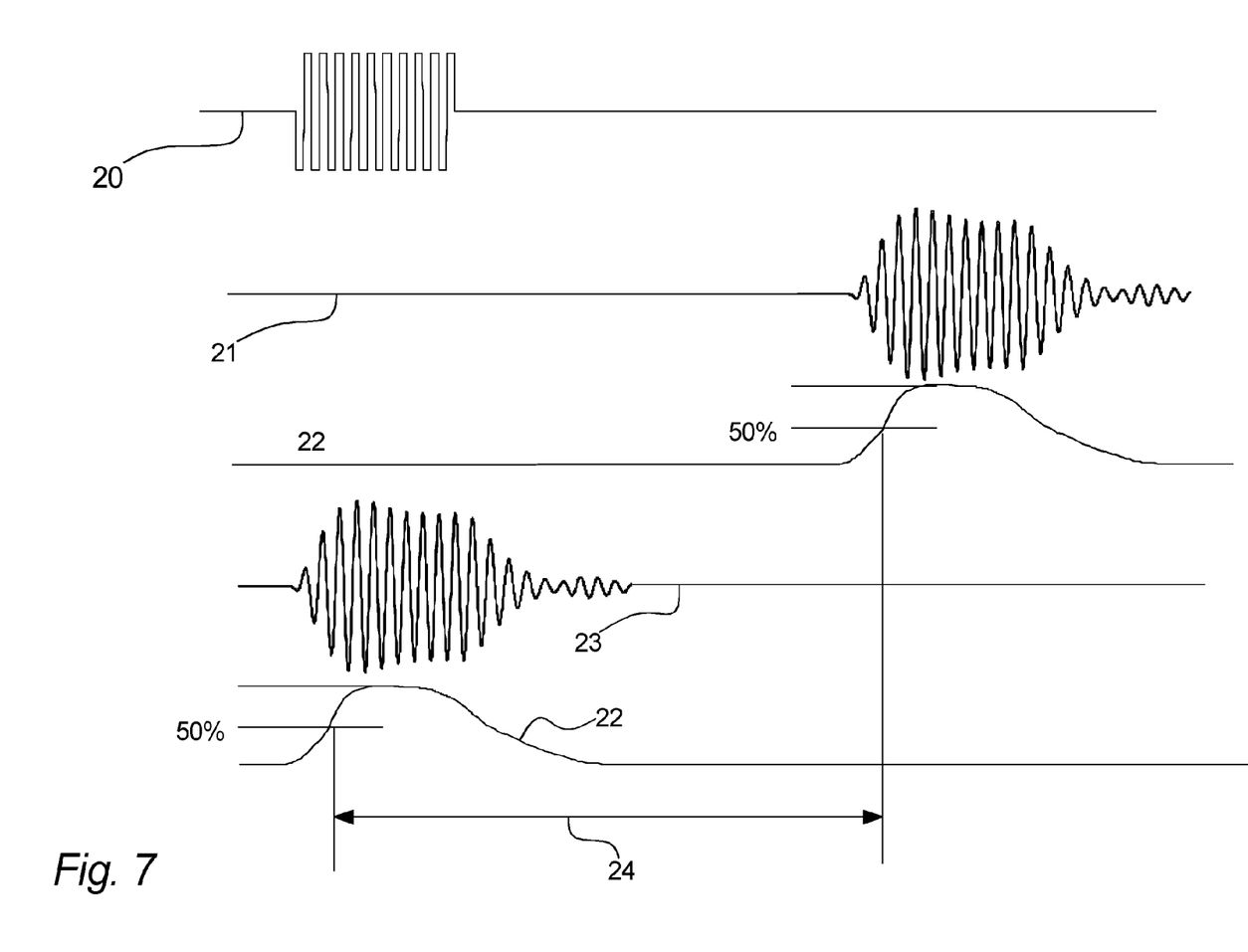
FIG. 7 illustrates measured and emulated signals according to an embodiment.

Now, referring to FIG. 7, an example of how to calculate the absolute transit times according to an embodiment of the invention is illustrated. First, the two transducers 3, 4, are characterized by determining characteristic quantities, such as an angular frequency of a dampened transducer oscillation and a damping coefficient of the dampened oscillations of the transducers 3, 4.

First, an input signal 20 is shown, which is entered into the system resulting in a measured physical flow meter response 21 with a certain delay, and in a simulation model response 23 with substantially no delay. If the simulation model of the transducers is adequate, the two response signals 21, 23 will be substantially identical except for the relative time delay 24, which is illustrated in FIG. 7. The absolute transit time 24 may be found as the relative time delay 24 between the two responses 21, 23. The determination of this absolute transit time may be done very precisely, for instance by finding a filtered envelope 22 of each of the two signals and determining the time difference between the two points, in which the filtered envelopes have reached 50% of their maximum value, respectively. This approach for finding the absolute transit time is illustrated schematically in FIG. 7.

The precision of the above mentioned method, however, may be increased substantially when using ultrasound reflectors according to the invention, such as e.g. brass, whereby oscillations of the ultrasound reflectors may be substantially reduced, and thereby reducing distortion in the signal and, ultimately increasing the accuracy of the determination of the absolute transit times.

Figure 1:
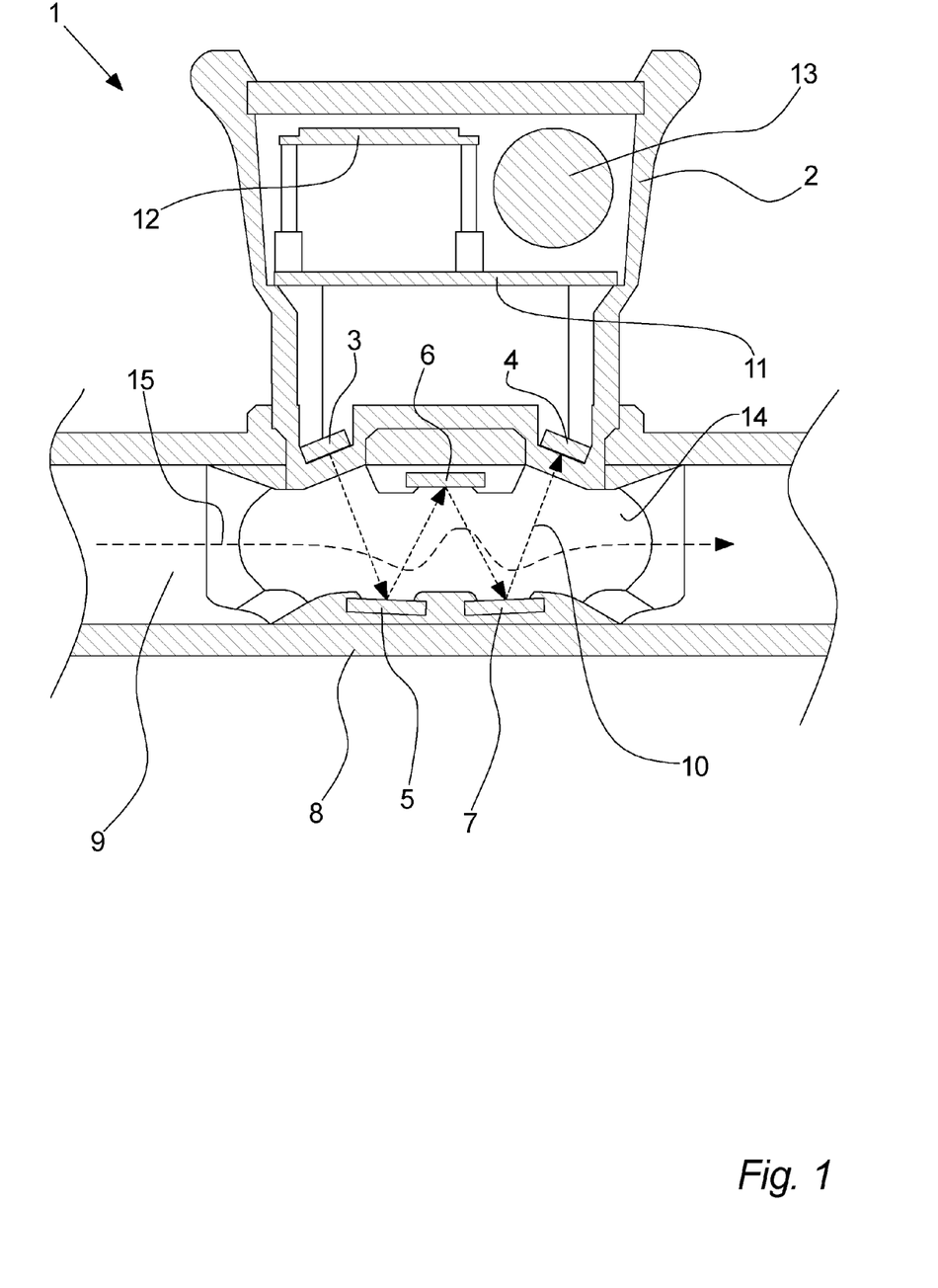
FIG. 1 illustrates a cross-sectional view of an ultrasonic flow meter according to an embodiment.

Referring to FIG. 1, an ultrasonic flow meter is illustrated according to an embodiment of the invention. The ultrasonic flow meter 1 comprises a meter housing 2, a first and a second ultrasound transducer 3, 4, a first, second, and third ultrasound reflector 5, 6, 7, a display 12, a battery 13, an electronic control arrangement 11, a flow tube 8, and a flow channel insert 14. The electronic control arrangement 11 is connected to the battery 13 so as to received power from the battery, connected to said display 12 so as to communicate information to a person inspecting the ultrasonic flow meter 1, and connected to said first and second ultrasound transducers 3, 4 so as to control emission of ultrasound from the transducers 3, 4 and/or receive an electronic signal from the transducers 3, 4 based on an ultrasound signal received by the transducer 3, 4. The ultrasound transducers 3, 4 are adapted to transmit an ultrasound signal, the pulse travelling e.g. from the first to the second ultrasound transducer 3, 4, being reflected subsequently by the first, second, and third ultrasound reflectors 5, 6, 7 before reaching the second ultrasound transducer 4, thereby defining an ultrasound path 10. It is to be noted, that the ultrasound path 10 is illustrated on FIG. 1 as a line for illustrative purposes, but is in reality a spatially distributed signal. The flow tube 8 defines a flow channel 9 as its inner space, through which a fluid may flow from an opening in a first end to an opening in the opposite end. Inside the flow tube 8, the flow channel insert 14 is positioned. The flow channel insert 14 fixates the ultrasound reflectors 5, 6, 7, e.g. between two half-parts, and furthermore modifies the flow of the fluid. Illustrated in FIG. 1 is a line representing fluid flow path 15. Note that the deviations from a straight line of an unperturbed flow may be exaggerated for illustrative purposes. As indicated, the fluid flow path 15 is changed to increase the overlap between the fluid flow path 15 and the ultrasound path 10, thereby increasing the accuracy of the flow measurement.

Typically, in some embodiments, the electronic control arrangement 11 may comprise a signal generator for generating an electronic signal to control the first and/or second ultrasound transducer 3, 4, which is to transmit an ultrasound signal 18, and, furthermore, a receiver circuit for receiving a signal from the opposite of said first and second ultrasound transducers 3, 4, which is the receiving transducer.

Figure 2:
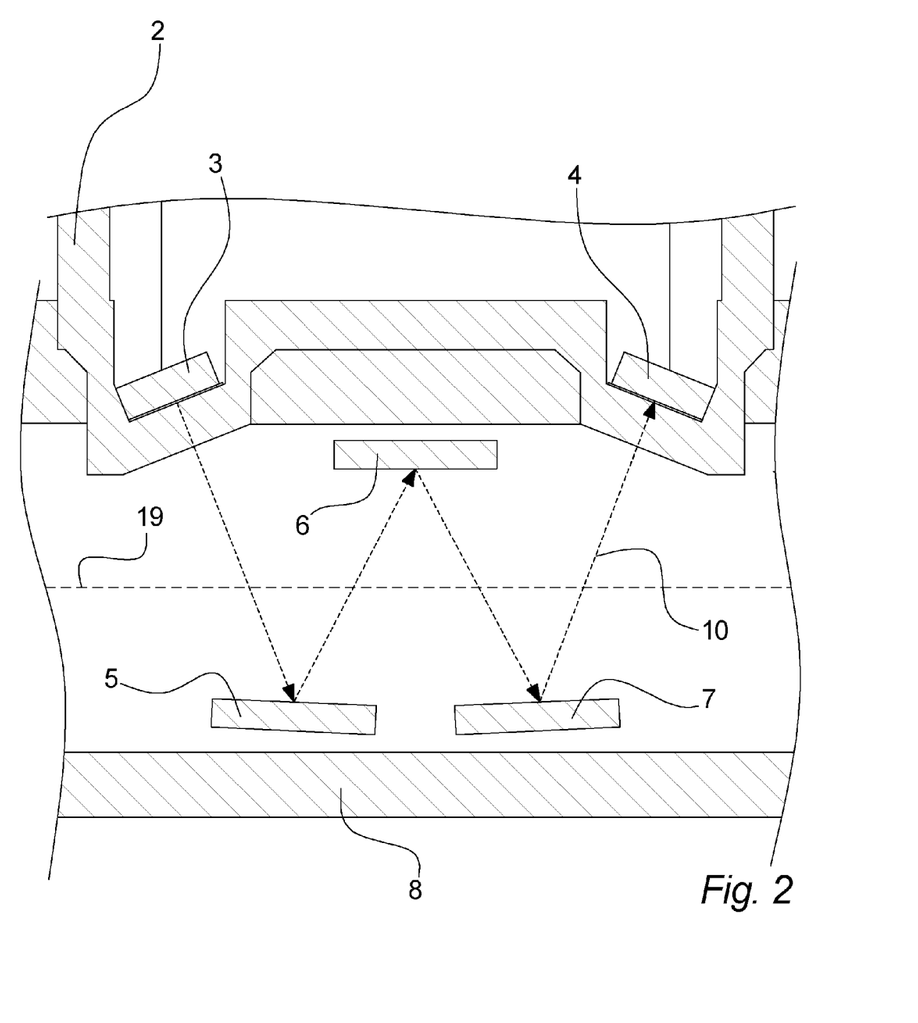
FIG. 2 illustrates a cross-sectional view of a part of an ultrasonic flow meter according to an embodiment.

Referring to FIG. 2, a closer view of a part of an ultrasonic flow meter 1 is illustrated according to an embodiment of the invention. For illustrative purposes, only the ultrasound reflectors 5, 6, 7 are shown inside the flow tube 8 together with a longitudinal axis 19 of the flow tube 8.

Figure 3:
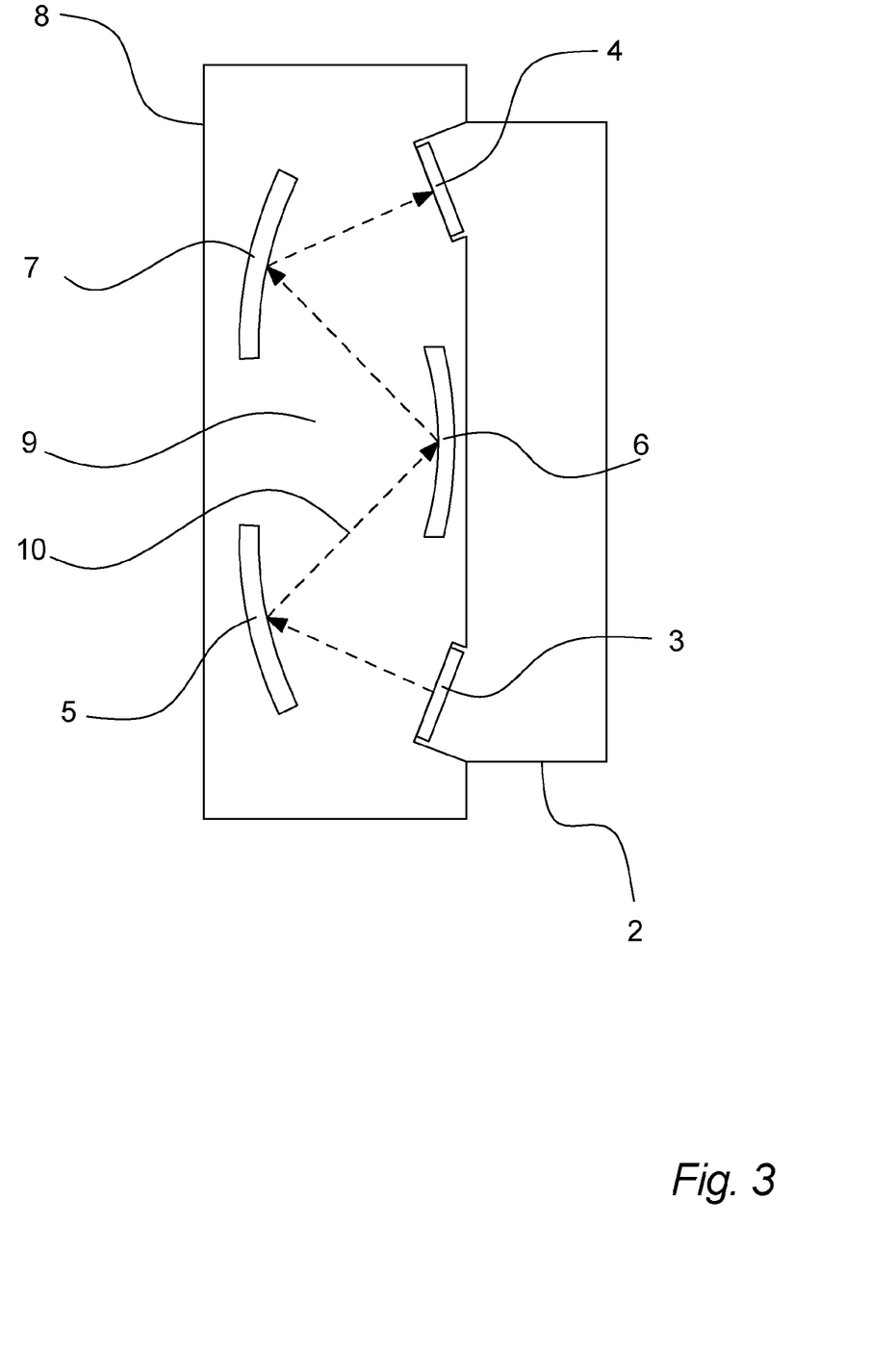
FIG. 3 illustrates a cross-sectional view of an ultrasonic flow meter according to an embodiment.

Simulations have been made in order to verify the advantages of the ultrasonic flow meter according to the invention. In FIG. 3 is illustrated a model of the ultrasonic flow meter 1, comprising a flow tube 8 defining a flow channel 9, a meter housing 2, a first and a second ultrasound transducer 3, 4, and a first, second, and third ultrasound reflector 5, 6, 7. As illustrated an ultrasound path 10 extends from the first ultrasound transducer 3, via the first ultrasound reflector, where it is reflected, to the second ultrasound reflector, where it is reflected again, to the third ultrasound reflector, where it is reflected again, to the second ultrasound transducer 4, where it is detected. As illustrated, the first, second, and third ultrasound reflectors 5, 6, 7 are curved so as to counteract divergence of the ultrasound signal. With respect to simulations illustrated on FIGS. 4, 5, 6A, and 6B, one important note is that neither the effect of the transmitting (first) transducer 3 nor the receiving (second) transducer 4 is included in any the simulations, as the purpose alone is to demonstrate the effect of the ultrasound reflectors 5, 6, 7. In the simulations described below, ultrasound reflectors with a thickness of 1.0 mm have been used. However, other simulation have been carried out as well with 0.5 mm reflectors essentially confirming the below results.

Figure 4:
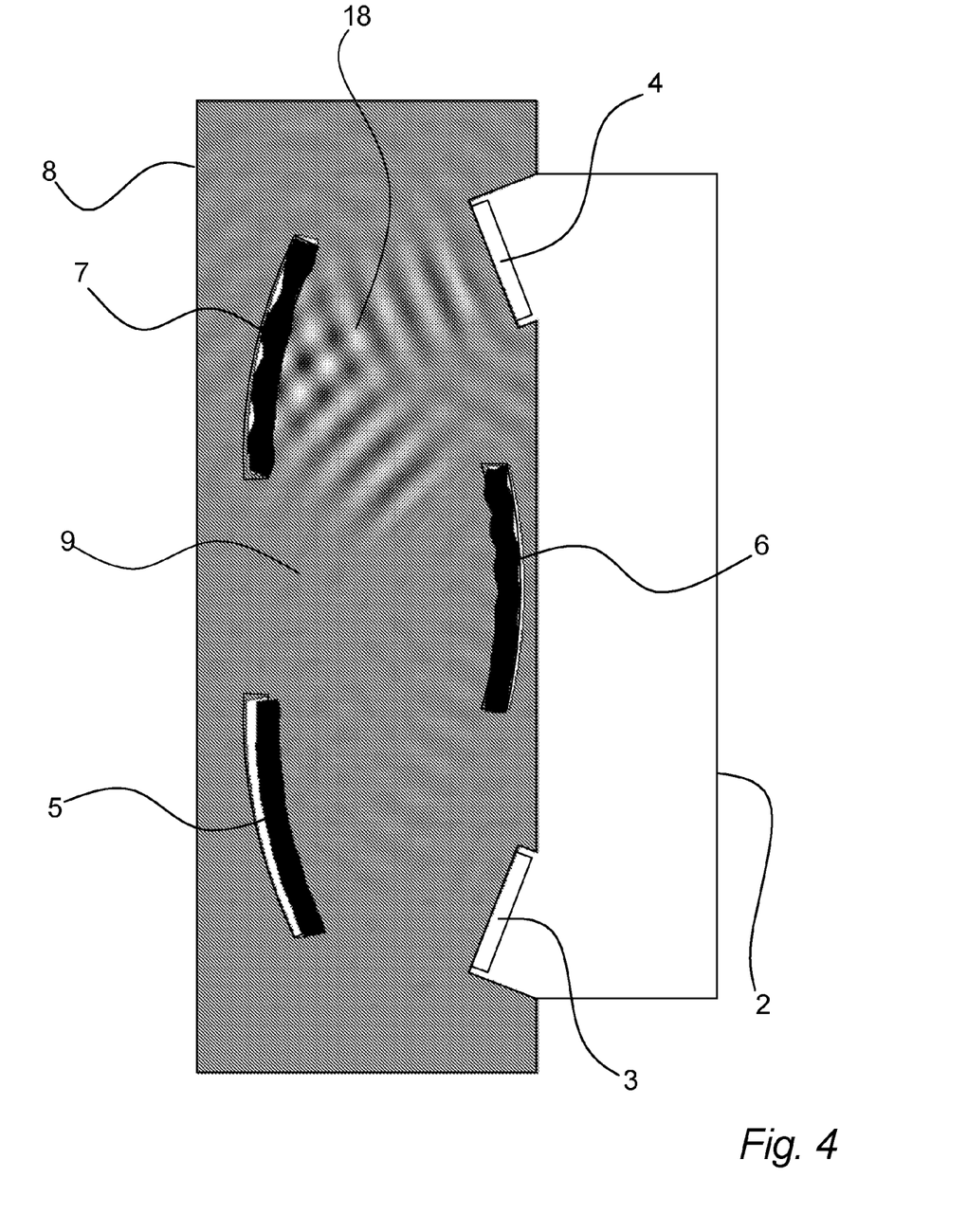
FIG. 4 illustrates a cross-sectional view of a simulation of an ultrasonic flow meter according to an embodiment.

In FIG. 4 is seen the result of a first simulation using ultrasound reflectors 5, 6, 7 made of brass. The pressure in the fluid medium is illustrated by the gray-scale color, light color indicating decreased pressure, while darker color indicates increased pressure. The simulation is started at time equal 0 μs and propagated until time equal to 30 μs. At time equal 1 μs, a 1 MHz pressure signal consisting of 10 pulses is transmitted. FIG. 4 illustrates the instantaneous pressure distribution at time equal to 30 µs. As seen in FIG. 4, the ultrasound signal 18 extends approximately from midway between the second and third ultrasound reflectors 6, 7 onto the second ultrasound transducer 4. As seen the ultrasound reflectors are affected by the ultrasound signal 18, the ultrasound signal 18 inducing vibrations into the reflectors 5, 6, 7. Also, some disturbance is seen elsewhere inside the flow tube 8, which may be a result of e.g. the vibrations in the ultrasound reflectors.

Figure 5:
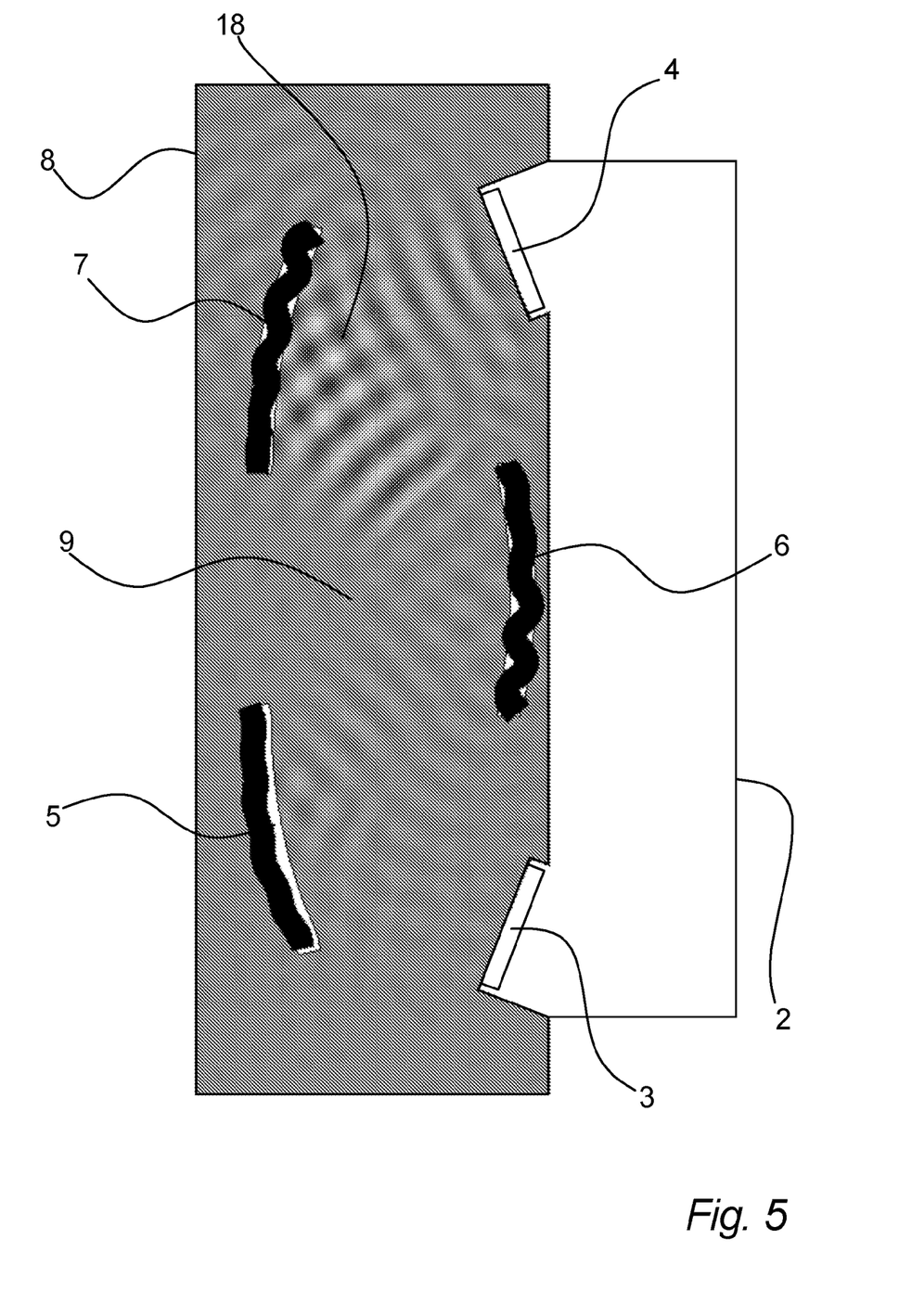
FIG. 5 illustrates a cross-sectional view of a simulation of an ultrasonic flow meter according to an embodiment.

Furthermore, in FIG. 5 is seen the result of a second simulation with a similar simulation setup, differing only by using ultrasound reflectors 5, 6, 7 made of stainless steel. Note that ultrasound signal 18 is shown in approximately the same position as in FIG. 4, i.e. FIG. 5 shows the pressure distribution at time equal 30 µs, the ultrasound signal 18 being transmitted at time equal 1 µs. As can be seen, the vibrations of the ultrasound reflectors 5, 6, 7 made of stainless steel shown in FIG. 5 are more significant than for reflectors of brass as shown in FIG. 4, indicating an easier or more effective coupling of energy from the ultrasound signal 18 to the vibrational modes of stainless steel reflectors compared to brass reflectors. Also, disturbance of the fluid outside the ultrasound signal 18 is more significant, e.g. around the first ultrasound reflector. This is in fact due to an ultrasound signal moving in the opposite direction.

Also, a comparison between the two simulations show that brass reflectors vibrate primarily in an extensional mode, while the stainless steel reflectors vibrate primarily in a flexural mode.

Figure 6A:
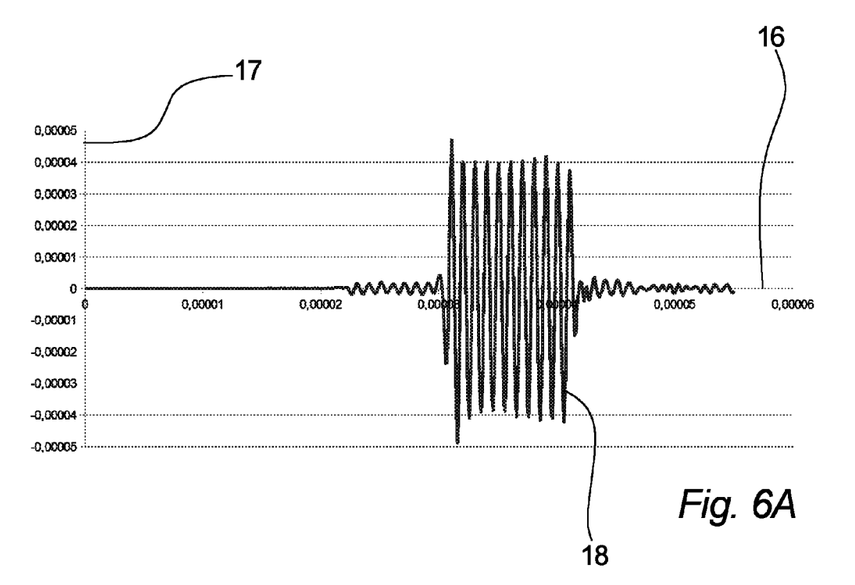
FIG. 6A illustrates a received simulated signal according to an embodiment.
Figure 6B:
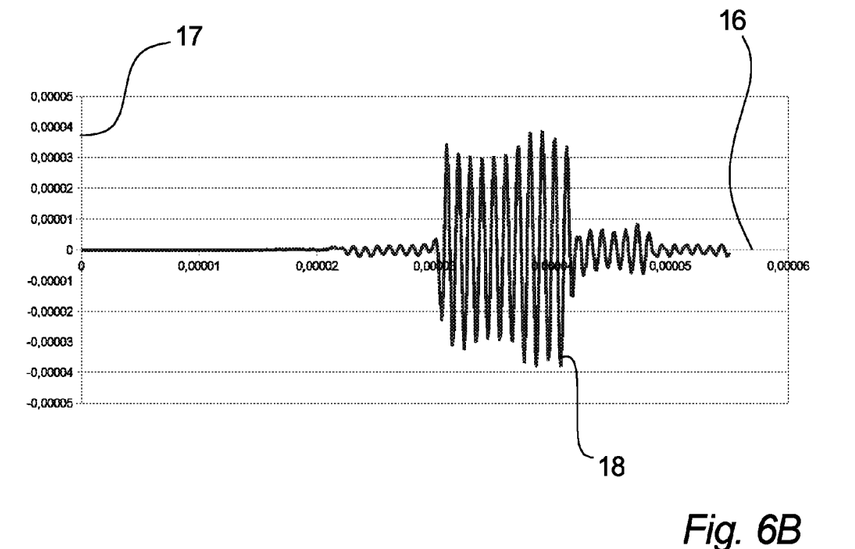
FIG. 6B illustrates a received simulated signal according to an embodiment.

Furthermore, in FIG. 6A is illustrated the simulated received pressure signal corresponding to brass reflectors, i.e. to the signal in FIG. 4. In FIG. 6B is illustrated the simulated received pressure signal corresponding to stainless steel reflectors, i.e. to the signal in FIG. 5. The scale on the x-axes 16 are both in seconds, i.e. the temporal extend of the ultrasound signal 18 is approximately 0.00001 s=10 µs. As can be readily observed from the graphs on FIGS. 6A and 6B, the simulation have been continued for a longer period than the 30 µs shown in FIGS. 4 and 5, namely to about 55 µs. The y-axes 17 is given in same arbitrary units, such that the signal shown in FIGS. 6A and 6B may be compared using these units. A further important note is that, similar to the note relating to FIGS. 4 and 5, the effects of the transducers have not been included in this simulation, as the purpose is to show the effect of the ultrasound reflectors alone. Indeed, in measurements where the transducers always modulate the signal, a much more gradual rise and decay of the ultrasound signal may be observed. It may therefore typically be more difficult to determine from a measured signal where such a signal starts and ends, in contrast to the signals shown in FIGS. 6A and 6B. By comparison between FIGS. 6A and 6B, FIG. 6B shows significantly more vibrational signal outside the actual ultrasound signal, which may e.g. be a result of distortion introduced into the signal by the ultrasound reflectors, ultimately adversely affecting the accuracy of the absolute transit time measurement. More importantly, it is shown by comparison that of FIGS. 6A and 6B that the simulated measured ultrasound signal 18 in FIG. 6A is have a more stable profile compared to the simulated measured ultrasound signal 18 in FIG. 6B. This may be very important in absolute transit time meters with high accuracy. The uncertainty may often, in such meters, be substantially less than the temporal extend of the ultrasound signal 18, and, therefore, be comparable to or even less than a single oscillation period. If the signal or a part of the signal is distorted, however, it may not be possible to compare the transmitted and the measured signals with the same accuracy. Although such comparison may be done in various ways, both in time space and/or frequency space, an intuitive illustration may be that in time space a comparison may include identifying particular positions in the pulse train, such as e.g. the third pulse, distortion of the signal may prevent such identification from being done, or at least decrease the accuracy.

According to an example embodiment of the invention, ultrasound transducers with a resonance frequency of about 1 MHz are used, i.e. emitting ultrasound with a period of about 1 µs. One transducer, e.g. the first ultrasound transducer, emits an ultrasound signal being a pulse train of about 21 pulses, i.e. about 21 oscillations. Therefore the ultrasound signal has a temporal length of about 21 µs. These pulses moves through a fluid medium in the tube, e.g. water, is reflected subsequently by the first, second, and third ultrasound reflectors, and, finally, the ultrasound signal is incident on the second ultrasound transducer, where it is detected and converted into an electronic signal by the second ultrasound transducer, thereby measuring the transit time of the ultrasound signal between the first and the second ultrasound transducer. While a measurement of a physical quantity inevitably implies an uncertainty on the measured quantity, the uncertainty on the measured transit time has been reduced to about 0.1 µs or even less, i.e. about $\frac{1}{210}$ of the temporal length of the ultrasound signal or even less.

LIST OF FIGURE REFERENCES

1. Ultrasonic flow meter
2. Meter housing
3. First ultrasound transducer
4. Second ultrasound transducer
5. First ultrasound reflector
6. Second ultrasound reflector
7. Third ultrasound reflector
8. Flow tube
9. Flow channel
10. Ultrasound path
11. Electronic control arrangement
12. Display
13. Battery
14. Flow channel insert
15. Fluid flow path
16. X-axis
17. Y-axis
18. Ultrasound signal
19. Longitudinal axis of the flow tube
20. Input signal
21. Flow meter response
22. Filtered envelope
23. Simulation model response
24. Absolute transit time

The invention claimed is:
1. An ultrasonic flow meter comprising
a flow tube defining a flow channel for a fluid to be measured, and
at least two ultrasound reflectors fixated inside said flow tube,
a first ultrasound transducer,
a second ultrasound transducer,
an electronic control arrangement for operating said ultrasonic flow meter,
said ultrasound transducers and reflectors having relative positions and orientations defining an ultrasound path from said first ultrasound transducer, via said at least two ultrasound reflectors, to said second ultrasound transducer, and vice versa, said ultrasonic flow meter being adapted to measure absolute transit times of an ultrasound signal from said first ultrasound transducer to said second ultrasound transducer, and/or vice versa, wherein said ultrasound reflectors comprises at least 50% by weight of copper, and wherein said ultrasound signal comprises at least 8 pulses.

2. The ultrasonic flow meter according to claim 1, wherein said ultrasonic flow meter furthermore is adapted to measure the temporal difference between the transit time of an ultrasound signal from said first ultrasound transducer to said second ultrasound transducer and vice versa.

3. The ultrasonic flow meter according to claim 1, having a third ultrasound reflector.

4. The ultrasonic flow meter according to claim 1, wherein said at least two ultrasound reflectors are focusing.

5. The ultrasonic flow meter according to claim 1, wherein said fluid is a liquid.

6. The ultrasonic flow meter according to claim 1, wherein said at least two ultrasound reflectors are orientated with a non-zero angle relative to a longitudinal axis of the flow tube.

7. The ultrasonic flow meter according to claim 1, wherein said ultrasound signal comprises at least 10 pulses.

8. The ultrasonic flow meter according to claim 1, wherein said ultrasonic flow meter is adapted to emulate a flow meter response similar to an output signal of a receiver circuit of the ultrasonic flow meter as the output signal would be, if there was no time delay in the transmission of an ultrasonic signal between said first and second ultrasound transducers.

9. The ultrasonic flow meter according to claim 8, wherein said emulation of said flow meter response may comprise
characterizing said first ultrasound transducer,
characterizing said second ultrasound transducer, and
emulating said flow meter response on the basis of said characterizations.

10. The ultrasonic flow meter according to claim 1, wherein said ultrasonic flow meter is adapted to measure an absolute transit time by
characterizing said first and second ultrasound transducers,
establishing a numerical model of said first and second ultrasound transducers,
simulating the ultrasonic flow meter by entering an input signal into said numerical model, thereby establishing a simulated flow meter response as if there was no time delay in the transmission of an ultrasound signal between said first and second ultrasound transducers,
measuring a measured flow meter response as the actual signal received by a receiving circuit of the receiving transducer,
calculating said absolute transit time as the time delay between the simulated flow meter response and the measured flow meter response.

11. The ultrasonic flow meter according to claim 1, wherein said ultrasonic flow meter is adapted to measure absolute transit times with a temporal uncertainty below 1/20 of the temporal length of the ultrasound signal.

12. The ultrasonic flow meter according to claim 1, wherein said at least two ultrasound reflectors comprise brass.

13. The ultrasonic flow meter according to claim 1, wherein said at least two ultrasound reflectors comprise at least 55% by weight of copper.

14. The ultrasonic flow meter according to claim 1, wherein said at least two ultrasound reflectors comprise at least 10% by weight of zinc.

15. The ultrasonic flow meter according to claim 1, wherein said at least two ultrasound reflectors comprise 0-0.5% by weight of lead.

16. The ultrasonic flow meter according to claim 1, wherein said ultrasonic flow meter is adapted to sample a signal received by said first and/or second ultrasound transducer with a frequency less than twice the frequency of the emitted ultrasound signal.

17. The ultrasonic flow meter according to claim 1, wherein said ultrasonic flow meter comprises a battery for powering said ultrasonic flow meter.

18. The ultrasonic flow meter according to claim 1, wherein said ultrasonic flow meter comprises a flow channel insert, said at least two ultrasound reflectors being fixated in said flow channel insert.

19. An ultrasonic flow meter comprising
a flow tube defining a flow channel for a fluid to be measured, and
at least two ultrasound reflectors fixated inside said flow tube,
a first ultrasound transducer,
a second ultrasound transducer,
an electronic control arrangement for operating said ultrasonic flow meter,
said ultrasound transducers and reflectors having relative positions and orientations defining an ultrasound path from said first ultrasound transducer, via said at least two ultrasound reflectors, to said second ultrasound transducer, and vice versa,
said ultrasonic flow meter being adapted to measure absolute transit times of an ultrasound signal from said first ultrasound transducer to said second ultrasound transducer, and/or vice versa,
said ultrasonic reflectors being made by a reflector material,
wherein said ultrasound signal has a velocity in said reflector material between 3000 and 5500 m/s, and
wherein said ultrasound signal comprises at least 8 pulses.

20. The ultrasonic flow meter according to claim 19, wherein said reflector material has an acoustic impedance of at least 20 MRayl (106 kg/(s·m$^2$)).

* * * * *